United States Patent
Patronen et al.

(10) Patent No.: US 6,298,219 B1
(45) Date of Patent: Oct. 2, 2001

(54) DETERMINATION OF NEIGHBOUR CELLS IN A BASE STATION

(75) Inventors: Petri Patronen; Aki Suhonen, both of Oulu; Marko Silventoinen, Helsinki, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/242,412

(22) PCT Filed: Jun. 17, 1998

(86) PCT No.: PCT/FI98/00529

§ 371 Date: Nov. 17, 1999

§ 102(e) Date: Nov. 17, 1999

(87) PCT Pub. No.: WO99/00999

PCT Pub. Date: Jan. 7, 1999

(30) Foreign Application Priority Data

Jun. 18, 1997 (FI) .......................................... 972618

(51) Int. Cl.[7] .............. H04B 17/00; H04Q 7/30
(52) U.S. Cl. ................ 455/67.4; 455/67.1; 455/423; 455/446
(58) Field of Search .................... 455/423, 446, 455/447, 448, 449, 436, 67.1–67.4, 561, 562

(56) References Cited

U.S. PATENT DOCUMENTS

| | | | |
|---|---|---|---|
| 4,704,734 | 11/1987 | Menich et al. ........................ | 455/33 |
| 5,673,307 | * 9/1997 | Holland et al. ...................... | 455/436 |
| 5,687,217 | * 11/1997 | Bliss et al. ........................... | 455/446 |
| 5,802,473 | * 9/1998 | Rutledge et al. ..................... | 455/441 |
| 5,854,981 | * 12/1998 | Wallstedt et al. .................... | 455/439 |
| 5,915,221 | * 6/1999 | Sawyer et al. ....................... | 455/437 |

FOREIGN PATENT DOCUMENTS

| | | |
|---|---|---|
| 195 37 398 | 4/1997 | (DE) . |
| 702 462 | 3/1996 | (EP) . |
| 97/18683 | 5/1997 | (WO) . |

* cited by examiner

*Primary Examiner*—Vivian Chang
*Assistant Examiner*—Duc Nguyen
(74) *Attorney, Agent, or Firm*—Pillsbury Winthrop LLP

(57) ABSTRACT

The invention relates to a method for the determination of neighbours of a sub-cell (122C) in a cellular radio network base station (100) applying dynamic channel allocation, and to a base station (100) implementing the method. The base station (100) comprises at least two sub-cells (122A, 122B, 122C). Each sub-cell (122A, 122B, 122C) comprises an antenna unit (118A, 118B, 118C) with a fixed connection to the base station (100). A transceiver (TRX1–TRX2–TRXN) is used for transmitting a signal through an antenna unit (118A, 118B, 118C). A measurement unit (124) measures through the antenna unit (118A, 118B, 118C) the reception power of the received signal. The invention is characterized in that a transceiver (TRX1) is used for transmitting a test signal (200) through the antenna unit of the sub-cell (122C) under examination. The test signal (200) is received though the antenna units (118A, 118B) of the of the sub-cells (122A, 122B). The measurement unit (124) measures through the antenna units (118A, 118B) of the other sub-cells (122A, 122B) the reception power of the received test signal (200). Lastly, on the basis of the reception powers of the test signal (200) measured in the control unit (114), the sub-cells (122B) that are neighbours of the sub-cell (122C) under examination arm determined.

22 Claims, 5 Drawing Sheets

DETERMINATION OF NEIGHBOUR CELLS IN A BASE STATION

FIELD OF THE INVENTION

The invention relates to a method for the determination of neighbours of a sub-cell in a cellular radio network base station applying dynamic channel allocation, the base station comprising at least two sub-cells; in each sub-cell, an antenna unit with a fixed connection to the base station; at least one transceiver for transmitting a signal through the antenna unit; at least one measurement unit for measuring the reception power of the signal received through the antenna unit.

BACKGROUND OF THE INVENTION

A problem in the above described arrangement is that the system operator manually determines the neighbours of each base station's sub-cells. The neighbours must be determined because a sub-cell and its neighbour cell cannot use one and the same dynamically selected frequency/time slot combination because transmitters occupying the same frequency and time slot would cause too much co-channel interference for each other. In addition, handover between sub-cells becomes difficult if the neighbours are not determined. A manual determination of neighbours requires time-consuming manual measurements of reception powers, performed within the sub-cells. A large number of measurements may be required. When a new sub-cell is added to the system, or the position of a sub-cell antenna unit is changed, manual determination of neighbours will have to be repeated. This makes the system significantly more difficult to optimise and to expand, and increases the operating costs of the system.

BRIEF DESCRIPTION OF THE INVENTION

An object of the invention is thus to provide a method and an equipment implementing the method to allow the above mentioned problems to be solved. This is achieved with a method described in the preamble, characterized in that: a transceiver is used for transmitting a test signal through an antenna unit of a sub-cell under examination; the test signal is received through antenna units of other sub-cells; a measurement unit is used for measuring the reception power of the test signal received through the antenna units of the other sub-cells; on the basis of the measured reception powers of the test signal, neighbour sub-cells of the sub-cell under examination are determined.

The invention also relates to a cellular radio network base station comprising: dynamic channel allocation; at least two sub-cells; in each sub-cell, an antenna unit with a fixed connection to the base station; at least one transceiver for transmitting a signal through an antenna unit; at least one measurement unit for measuring the reception power of the signal received through an antenna unit; a switching field for connecting a signal to travel between a particular transceiver and antenna unit; a control unit controlling the operation. The base station according to the invention is characterized in that: the control unit is arranged to direct the transceiver to transmit a test signal through an antenna unit of the sub-cell under examination connected via the switching field; the antenna units of the other sub-cells are arranged to receive the test signal; the measurement unit is arranged to measure the reception power of the test signal received through the antenna units of the other sub-cells; the control unit is arranged to determine, on the basis of the measured reception powers of the test signal, the neighbour sub-cells of the sub-cell under examination.

The preferred embodiments of the invention are disclosed in the dependent claims.

The invention is based on determining, on the basis of a reception power, those neighbour sub-cells in which a signal transmitted through the sub-cell under examination could cause disturbance. In such case, the reception power of a test signal is high enough in the neighbour sub-cells concerned. The neighbour sub-cells thus found should not use the same frequency/time slot pairs as the sub-cell under examination.

The method and arrangement of the invention provide many advantages. Manual measurements of reception powers are not needed. It is therefore easier and less expensive to add new sub-cells and to change existing sub-cells. The quality of connections improves because sub-cells applying the same frequency/time slot pair and thus causing interference for each other are placed at a sufficiently long distance from each other. The reliability of successful handover is enhanced.

BRIEF DESCRIPTION OF THE DRAWINGS

In the following the invention will be described in greater detail in connection with preferred embodiments and with reference to the attached drawings, in which.

DETAILED DESCRIPTION OF THE INVENTION

Figure 1:
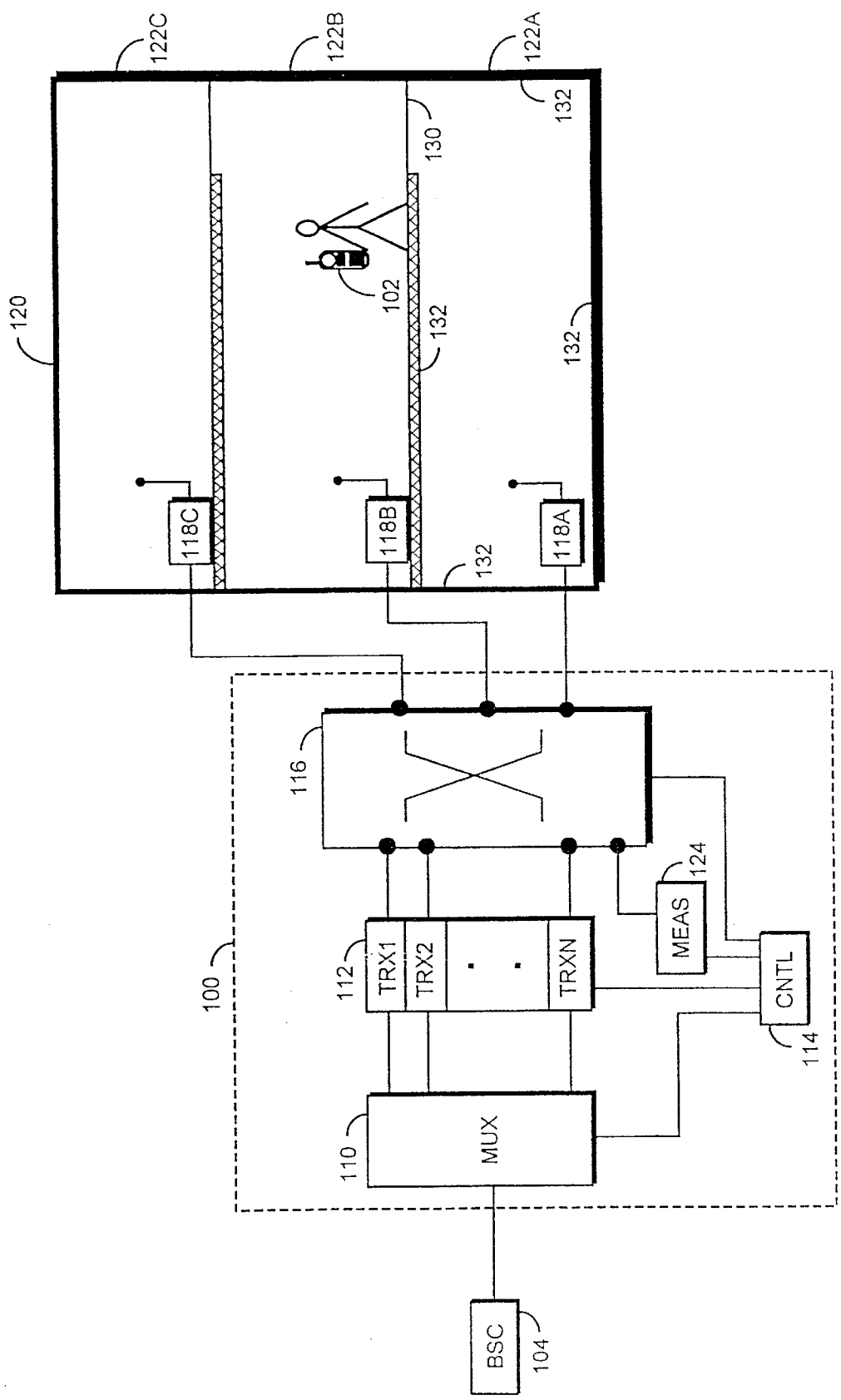
FIG. 1 illustrates an example of a structure of a base station according to the invention.

With reference to FIG. 1, let us now study a cellular radio network of the invention. The cellular radio network comprises at least one base station 100 applying dynamic channel allocation, i.e. a channel allocation method in the purest form of which all system frequencies are in use in every cell. Channel selection is performed at call set-up on the basis of the interference situation prevailing at the moment in question. The system possibly also comprises base stations applying fixed channel allocation, i.e. a channel allocation method in which the frequencies available to the system are divided into groups, each cell then using a particular frequency group. One and the same frequency group can be re-allocated to cells that are sufficiently far apart from each other.

The invention is thus applicable for use in office systems only comprising base stations of the invention, or in different hybrid systems which possibly use also macro cells that apply fixed or dynamic channel allocation. The cellular radio network of the invention is preferably a GSM/DCSIPCS 1900 network.

The base station 100 is in contact with a base station controller 104 controlling one or more base stations. In certain types of systems, such as in small separate office systems, the operations of the base station 100 and the base station controller 104 can be integrated into one and the same physical apparatus.

FIG. 1 illustrates, as an example of the sub-cells of the base station 100, a ground floor 122A, a first floor 122B and a second floor 122C of a multi-storey building 120. In each floor 122A, 122B, 122C, the base station is provided with a fixed connection to an antenna unit 118A, 118B, 118C. An antenna unit can comprise one or more antennas. A fixed connection can be implemented for instance by means of a coaxial cable or optical fibre. The connection can be simplex or duplex. In a duplex connection the antenna unit 118A, 118B, 118C then comprises a duplex filter, an antenna filter, and amplifiers for both transmission directions. There are naturally also other ways of forming sub-cells, a sub-cell can be for instance a predetermined geographical area or, in a building, an area occupied by a particular floor. The number of sub-cells can also greatly vary depending on the situation.

For the sake of clarity, the Figure only illustrates one person carrying a subscriber terminal 102 in the building.

FIG. 1 also shows a more detailed structure of the base station 100. FIG. 1 only comprises the blocks that are essential for describing the invention, although it is apparent to a person skilled in the art that a common base station comprises other functions and structures, too, which need not be discussed in greater detail here. The base station can be for instance of the type used in the GSM system, comprising, however, the changes required by the invention. The base station comprises one or more transceivers TRX1–TRX2–TRXN. One transceiver TRX1–TRXN offers radio capacity for one TDMA frame, i.e. usually for eight time slots.

The base station 100 further comprises a switching field 116. The switching field 116 connects signals to travel between a particular transceiver TRX1–TRXN and an antenna unit 118A, 118B, 118C.

The base station comprises at least one measurement unit 124 for measuring through the antenna unit 118A, 118B, 118C of a sub-cell 122A, 122B, 122C the reception power of a received signal.

In addition, the base station comprises a control unit 114 controlling the operation of other devices, the control unit having a connection to each transceiver TRX1–TRXN, a multiplexer 110, a measurement unit 124 and the switching field 116. In addition to control functions, the control unit 114 can also be used for processing, receiving and storing data. The control unit 114 receives control data from the base station controller 104 via an abis interface.

The base station controller 104 can also directly control some parts, for instance the multiplexer 110. The functionality of the control unit 114 can be divided in different ways, for instance as shown in the Figure, the control operations then being concentrated in one unit 114. A plural number of control units 114 can also be employed, for instance one for controlling the switching field 116 and one for controlling the transceivers TRX1–TRXN. Some of the functionality can also be located in the base station controller 104.

Figure 2A:
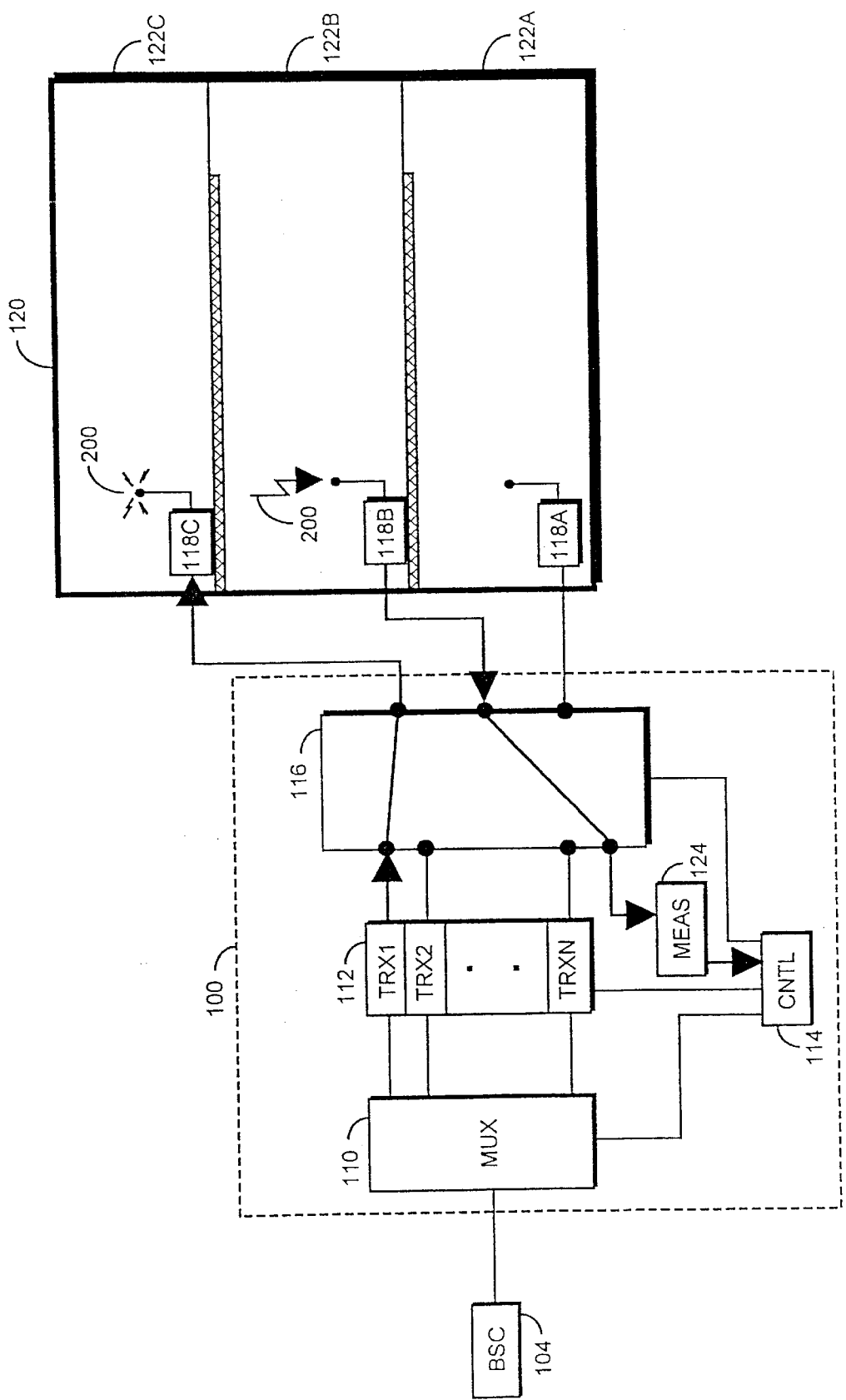
FIGS. 2A, 2B illustrate an example of the determination of neighbours.

In FIG. 2A the base station illustrated in FIG. 1 operates as required by the method of the invention. The sub-cell under examination is the sub-cell of the second floor 122C, so the neighbour sub-cells of the sub-cell of the second floor 122C are now determined. The control unit 114 directs the first available transceiver TRX1 to transmit a test signal 200 on a connection established, via the switching field 116, through the antenna unit 118C of the sub-cell of the second floor 122C.

The control unit 114 directs the measurement unit 124 to measure the reception power of the test signal 200 received, via the connection established using the switching field 116, through the antenna unit 118B of the sub-cell of the first floor 122B. The measured reception power value is transferred to the control unit 114 for storage.

Figure 2B:
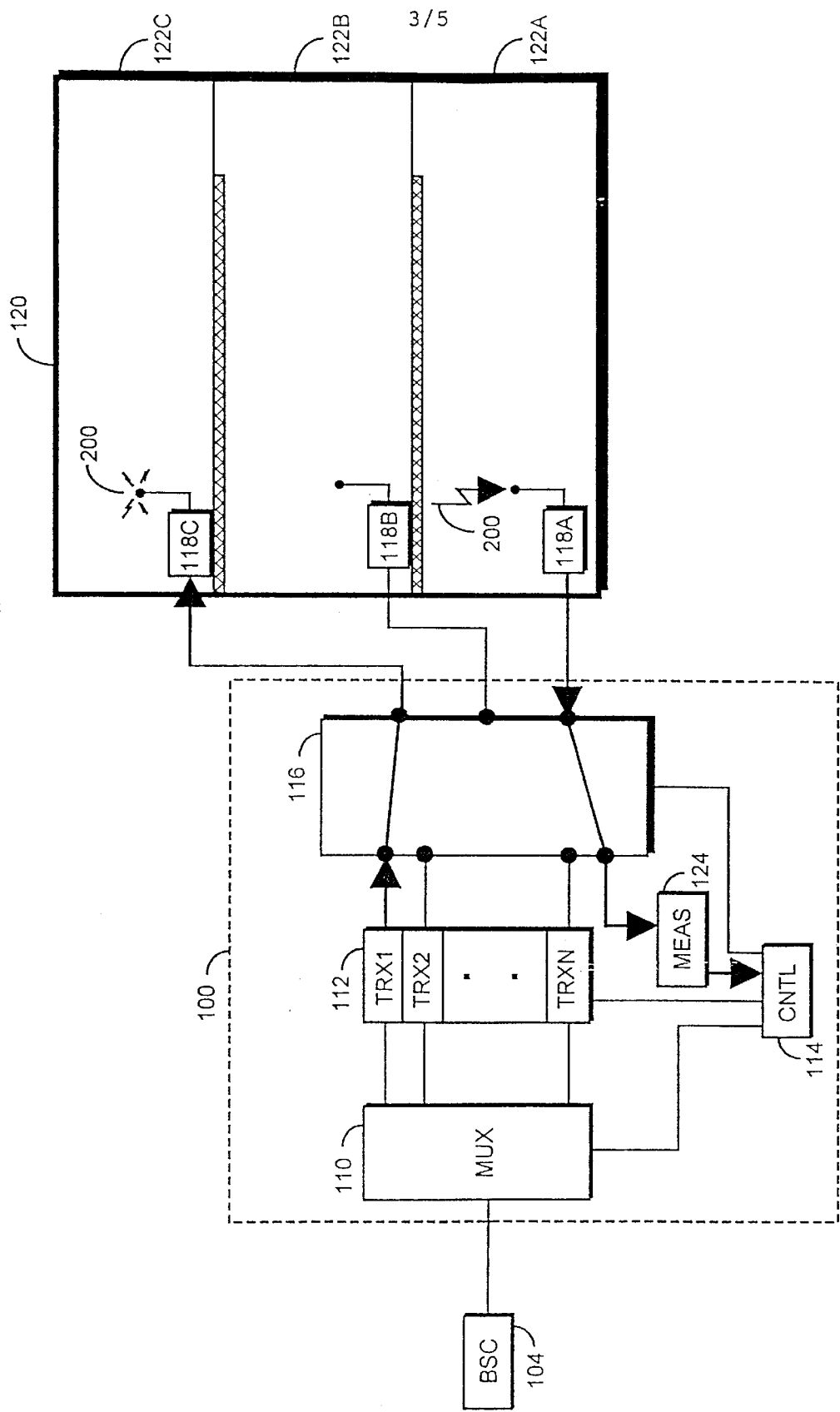

As shown in FIG. 2B, the control unit 114 then directs the measurement unit 124 to measure the reception power of the test signal 200 received, via the connection established using the switching field 116, through the antenna unit 118A of the sub-cell of the ground floor 122A. The measured reception power value is transferred to the control unit 114 for storage.

The reception power of the test signal now having been measured in all other sub-cells 122B, 122A, except in the sub-cell 122C under examination, the measured test signal reception powers stored in the control unit 114 are used for determining which sub-cells 122B, 122A are neighbours of the sub-cell 122C under examination. This can be performed at least in two ways. A predetermined number of sub-cells with the best reception powers are determined as the neighbours of the sub-cell under examination. Assuming that there were for instance two of them, then both sub-cells 122A, 122B would be determined as neighbours of the sub-cell 122C under examination.

According to another alternative, sub-cells in which the reception power exceeds a predetermined threshold value are determined as neighbours of the sub-cell under examination. In the example described, the reception power measured from the sub-cell 122B is probably higher than the reception power measured from the sub-cell 122A, due to the location of the sub-cells in question in relation to the sub-cell 122C. The sub-cell 122B would presumably exceed the threshold value and the sub-cell 122A would remain below it, depending, of course, on the threshold value set.

The time when the method of the invention is used for determining neighbours may vary greatly. The neighbours of a sub-cell can be determined at regular intervals The interval is then stored for instance in the memory of the control unit 114. In addition, somewhere in the base station 100, for instance in the control unit 114, there must be a clock showing the lapse of time to allow the determination to be performed at regular intervals. In principle, the base station controller 104 can also command the base station 100 it administers to perform the determination at regular intervals.

Sub-cell neighbours can also be determined by means of a command issued to the base station 100 to that effect by the network operator. The control unit 114 is then arranged to receive the command to perform the determination, issued by the operator via for instance a network management system managing a cellular radio network, a management system managing a subnetwork, or a system managing an individual network element, i.e. a base station in this case.

The control unit 114 can be arranged to perform the determination also at the start-up of the base station 100.

Further, the control unit 114 can be arranged to perform the determination in case the network circumstances change, for instance due to a new sub-cell being added to the base station 100.

In certain cases the sub-cells of a particular sub-cell may have to be determined manually. This means that propagation of radio waves in the sub-cell is severely blocked, which prevents the test signal from being received in the real neighbour sub-cells. As shown in FIG. 1, the sub-cell 122A can be so well insulated that areas 132 bordering the cell, i.e. walls, floor, ceiling, and a door opening 130, do not let radio waves through.

When the determination is being made, it must be ensured that thick doors 130, if any, are open, in order to allow also disturbances, that possibly occur rarely, to be identified, because radio waves propagate farther through an open door 130 than they do when the door 130 is closed. Another alternative is to trust that disturbances are rare and to perform the determination with the doors 130 closed.

Figure 2C:
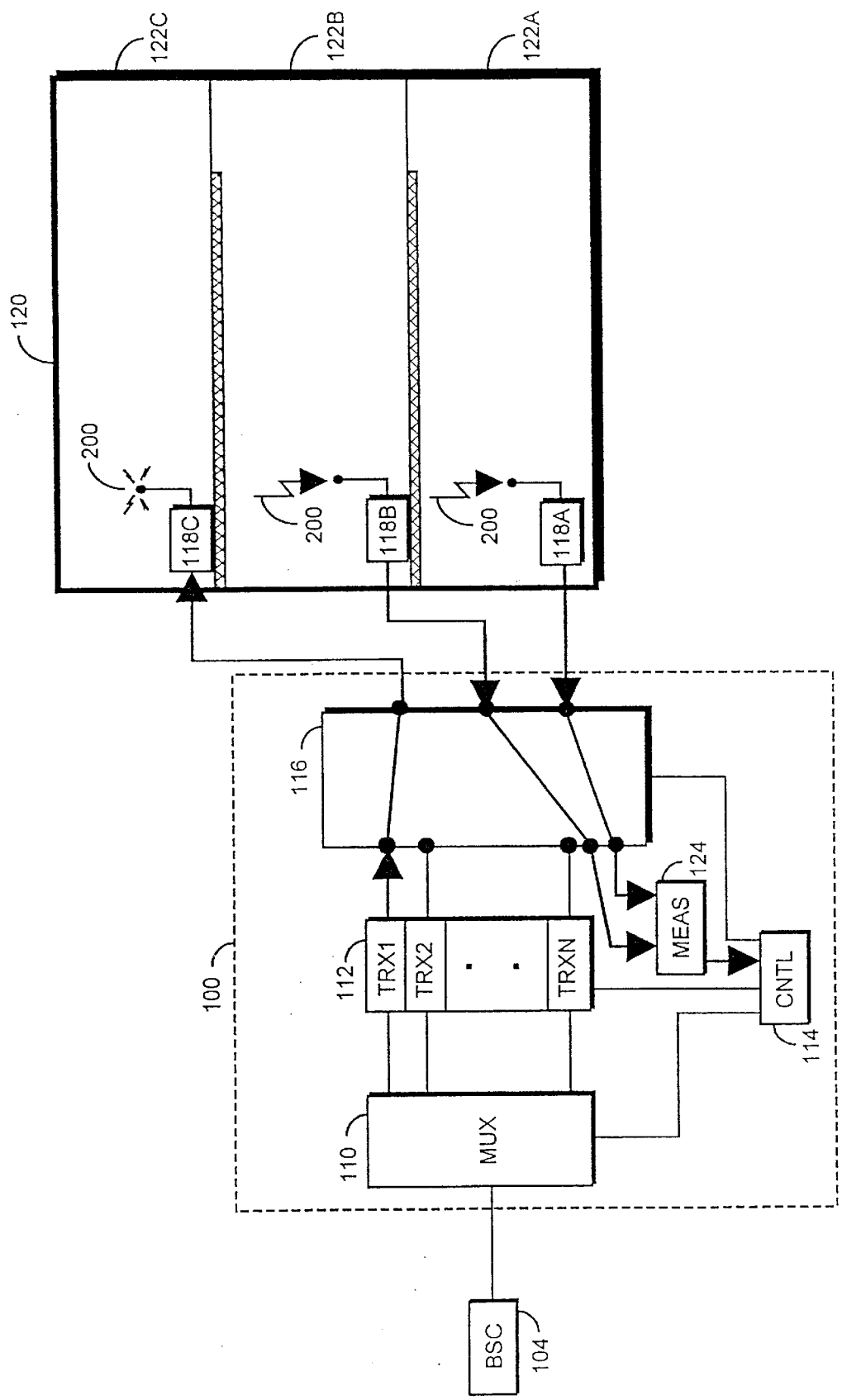
FIG. 2C illustrates a second example of the determination of neighbours.

According to a preferred embodiment described in FIG. 2C, the measurement unit 124 is arranged to simultaneously measure the reception powers in as many other sub-cells 122B, 122A as possible. Otherwise the determination takes place as shown in FIGS. 2A and 2B, except that the measurement unit 124 can simultaneously receive as many different signals as possible, two in this example, and measure the reception power of each signal separately. In the earlier example the reception powers in the other sub-cells were measured consecutively, one by one, because the measurement unit 124 was not capable of simultaneously measuring a plural number of signals. An advantage of the embodiment is that the measurements allow a better comparison to be made between them, because they take place at the same time instant in the same radio path circumstances.

The measurement unit 124 must then have a number of inputs corresponding to the possible number of signals. Also the switching field 116 must comprise a number of switching options corresponding to the number of the inputs of the measurement unit 124.

Figure 2D:
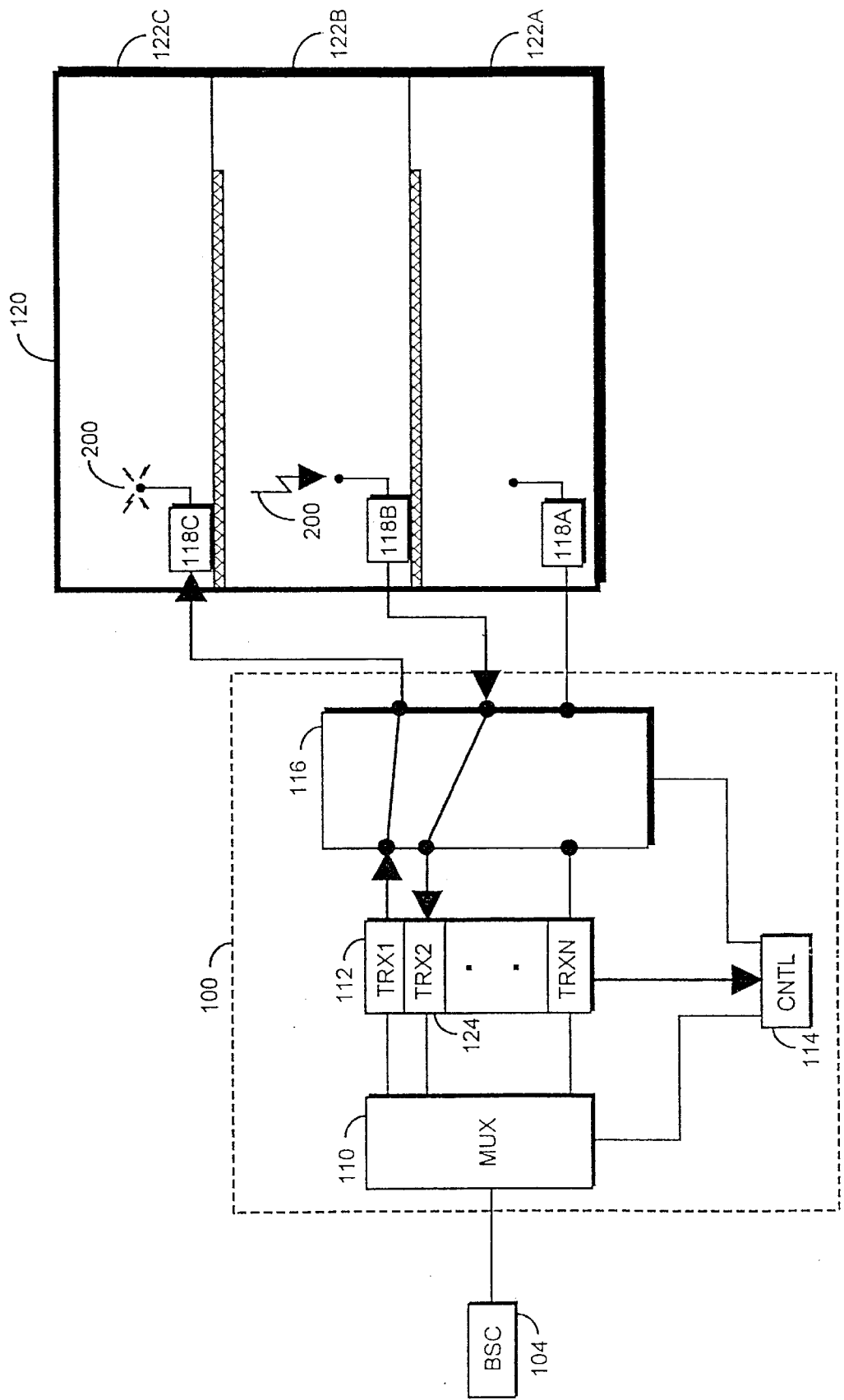
FIG. 2D illustrates a third example of the determination of neighbours.

FIG. 2D shows yet another embodiment different from the embodiments described earlier. It comprises at least one transceiver TRX2 which can also function as a measurement unit 124, a separate measurement unit 124 then being not necessarily needed. According to the principles of FIGS. 2A and 2B, the antenna units 118B and 118A of the sub-cells 122B and 122A are connected in turn to the transceiver TRX2 functioning as a measurement unit 124 and the reception power is measured. An advantage of this embodiment is that a separate measurement unit 124 dedicated to measurements alone is not necessarily needed.

According to an embodiment, sub-cell neighbours can be divided into classes the limits of which are determined according to the reception powers. The classes are then processed by applying fuzzy logic, in other words, simple rules are used for making decisions concerning the determination of the neighbours. An example of such a simple rule is to use the volume of traffic traversing the base station 100 as a basis for determining the classes that are the neighbours of the sub-cell at a particular moment; the less traffic, the more classes the neighbours comprise and the more traffic, the less classes the neighbours comprise. Thus, when the volume of radio traffic is low, the quality of connections is maximised. Correspondingly, when the number of connections is large, the capacity of the base station 100 is maximised at the expense of quality.

The classification allows the neighbour cell determination according to the invention to be repeated more often in the highest reception power class than in the others, the test signal being only received through the antenna units of sub-cells belonging to the highest reception power class. The system settings thus correspond, most of the time, to the system circumstances actually prevailing, verification of the circumstances being possible, in accordance with the invention, by means of measurements.

The invention is advantageously implemented by means of software, the invention then requiring only relatively simple changes in software within a carefully limited area in the control unit 114. in addition, a measurement unit 124 measuring the reception power of either a single signal or a plural number of signals at a time is needed, or at least one transceiver TRX2 which in addition to its normal operations is also capable of measuring signal reception power.

The neighbour relationships having been determined, measurement capacity can be allocated on the basis of antenna unit groups. A particular group then advantageously comprises antenna units of sub-cells which are each others neighbours. When a call is set up, a signal transmitted by a subscriber terminal is measured in each antenna unit group, the signal transmitted by the subscriber terminal and received through the antenna units belonging to the group in question being combined in each antenna unit group. Reception power is thus measured in each antenna unit group from the combined signal. The antenna unit group providing the best combined reception power is then further processed. From the antenna unit group is then measured, one by one, through each antenna unit belonging to the antenna unit group, the reception power of the received signal transmitted by the subscriber terminal. Lastly, the antenna unit providing the best reception power in the best antenna unit group is selected as the antenna unit providing the connection. The described method can also be applied for measurements needed in handover. The described method provides a considerable advantage in that it requires significantly less measuring capacity than a solution requiring a separate measurement unit for each or nearly each antenna unit. The described two-step measurement allows the number of measurement units to be reduced, which decreases the costs of setting up a base station.

Even though the invention is described above with reference to an example shown in the attached drawings, it is apparent that the invention is not restricted to it, but can vary in many ways within the inventive idea disclosed in the attached claims.

What is claimed is:

1. A method for the determination of neighbours of a sub-cell in a cellular radio network base station comprising:
    transmitting a test signal with a transceiver through an antenna unit of a sub-cell under examination;
    receiving the test signal through antenna units of other sub-cells;
    measuring with a measurement unit a reception power of the test signal received through the antenna units of the other sub-cells;
    determining neighbour sub-cells of the sub-cell under examination based on the measured reception powers of the test signal;
    dividing the neighbour sub-cells of the sub-cell under examination into classes, the limits of which being determined based on the measured reception powers; and
    determining which classes are neighbour sub-cells of the sub-cell based on the volume of traffic traversing the base station at a particular moment,
    wherein, the less traffic, the more classes are determined as neighbour sub-cells and the more traffic, the less classes are determined as neighbour sub-cells.

2. The method of claim 1, wherein the measured reception powers in the other sub-cells are measured consecutively.

3. The method of claim 1, wherein the measured reception powers in as many of the other sub-cells as possible are measured simultaneously.

4. The method of claim 1, wherein a predetermined number of sub-cells with the best measured reception power are determined as neighbour sub-cells of the sub-cell under examination.

5. The method of claim 1, wherein sub-cells in which the measured reception power exceeds a predetermined threshold value are determined as neighbour sub-cells of the sub-cell under examination.

6. The method of claim 1, wherein the neighbour sub-cells of the sub-cell under examination are determined at regular intervals.

7. The method of claim 1, wherein the neighbour sub-cells of the sub-cell under examination are determined when the network operator issues a command to that effect to the base station.

8. The method of claim 1, wherein the neighbour sub-cells of the sub-cell under examination are determined when the base station is started up.

9. The method of claim 1, wherein the neighbour sub-cells of the sub-cell under examination are automatically determined when a new sub-cell is added to the base station.

10. The method of claim 1, wherein neighbour sub-cells in which propagation of radio waves is severely blocked are determined manually.

11. The method of claim 1, wherein the determination of neighbour sub-cells of the sub-cell under examination is repeated more often in a class with the highest measured reception power than in other classes, the test signal being received only through the antenna units of the sub-cells belonging to the class with the highest measured reception power.

12. A cellular radio network base station comprising:
a transceiver configured to transmit as directed by a control unit a test signal through an antenna unit of a sub-cell under examination connected via a switching field;
antenna units of other sub-cells configured to receive the test signal;
a measurement unit configured to measure a reception power of the test signal received through the antenna units of the other sub-cells; and
a control unit configured to determine neighbour sub-cells of the sub-cell under examination based on the measured reception powers of the test signal, the control unit further being configured to divide the neighbour sub-cells of the sub-cell into classes, the limits of which are determined based on the measured reception powers; and
the control unit further configured to determine based on the volume of traffic traversing the base station the classes that are neighbour sub-cells of the sub-cell at a particular moment,
wherein the less traffic, the more classes are determined as neighbour sub-cells and the more traffic, the less classes are determined as neighbour sub-cells.

13. The base station of claim 12, wherein the measurement unit is configured to measure the reception powers consecutively.

14. The base station of claim 12, wherein the measurement unit is configured to simultaneously measure the reception powers in as many of the other sub-cells as possible.

15. The base station of claim 12, wherein the control unit is configured to determine a predetermined number of sub-cells with the best measured reception power as neighbour sub-cells of the sub-cell under examination.

16. The base station of claim 12, wherein the control unit is configured to determine the sub-cells in which the measured reception power exceeds a predetermined threshold value as neighbour sub-cells of the sub-cell under examination.

17. The base station of claim 12, wherein the control unit is configured to determine the neighbour sub-cells of the sub-cell under examination at regular intervals.

18. The base station of claim 12, wherein the control unit is configured to determine the neighbour sub-cells of the sub-cell under examination when the network operator issues a command to that effect to the base station.

19. The base station of claim 12, wherein the control unit is configured to determine the neighbour sub-cells of the sub-cell under examination when the base station is started up.

20. The base station of claim 12, wherein the control unit is configured to automatically determine the neighbour sub-cells of the sub-cell under examination when a new sub-cell is added to the base station.

21. The base station of claim 12, wherein the control unit is configured in such a way that neighbour sub-cells of the sub-cell under examination in which the propagation of radio waves is severely blocked are determined manually.

22. The base station of claim 12, wherein the control unit is configured to repeat the determination of the neighbour sub-cells of the sub-cell under examination more often in the class with the highest measured reception power than in the others, the test signal being only received through the antenna units of the sub-cells belonging to the class with the highest measured reception power.

* * * * *